US011269737B2

(12) United States Patent
Watt

(10) Patent No.: US 11,269,737 B2
(45) Date of Patent: Mar. 8, 2022

(54) INCREMENTALLY UPDATING RECOVERY MAP DATA FOR A MEMORY SYSTEM

(71) Applicant: Microsoft Technology Licensing, LLC, Redmond, WA (US)

(72) Inventor: Brennan Alexander Watt, San Clemente, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 80 days.

(21) Appl. No.: 16/572,530

(22) Filed: Sep. 16, 2019

(65) Prior Publication Data
US 2021/0081284 A1 Mar. 18, 2021

(51) Int. Cl.
G06F 12/02 (2006.01)
G06F 11/14 (2006.01)
G06F 11/07 (2006.01)

(52) U.S. Cl.
CPC ........ *G06F 11/1469* (2013.01); *G06F 11/073* (2013.01); *G06F 11/076* (2013.01);
(Continued)

(58) Field of Classification Search
CPC .. G06F 11/1471; G06F 11/073; G06F 11/076; G06F 12/0246; G06F 11/1466; G06F 11/1469; G06F 11/1451; G06F 2212/7201; G06F 2201/84; G06F 11/07; G06F 11/14; G06F 12/02
See application file for complete search history.

(56) References Cited

U.S. PATENT DOCUMENTS 10,255,137 B1 4/2019 Panidis et al.
2005/0022213 A1* 1/2005 Yamagami .......... G06F 11/1471
719/328

(Continued)

OTHER PUBLICATIONS

Shengan Zheng, Linpeng Huang, Hao Liu, Linzhu Wu and Jin Zha, "HMVFS: A Hybrid Memory Versioning File System," 2016 32nd Symposium on Mass Storage Systems and Technologies (MSST), 2016, pp. 1-14.*

(Continued)

*Primary Examiner* — Pierre Miche Bataille
(74) *Attorney, Agent, or Firm* — Ray Quinney & Nebeker P.C; James Bullough

(57) ABSTRACT

The present disclosure relates to systems, methods, and computer-readable media for generating and updating a recovery map that includes information that enables a computing device to recover a current state of memory. For example, systems disclosed herein may iteratively update segments of a memory snapshot based on a recent state of memory corresponding to discrete portions of a memory system. In addition, systems disclosed herein may discard outdated segments of the memory snapshot in addition to outdated journal updates at incremental checkpoints that facilitate a gradual update process that may significantly reduce recovery time upon experiencing an untimely power loss event. The systems described herein provide additional processing flexibility, reduce utilization of processing resources, and reduce media wear while accomplishing one or more benefits associated with efficient recovery of a current state of memory.

20 Claims, 9 Drawing Sheets

(52) U.S. Cl.
CPC ...... *G06F 11/1471* (2013.01); *G06F 12/0246* (2013.01); *G06F 2201/84* (2013.01); *G06F 2212/7201* (2013.01)

(56) References Cited

U.S. PATENT DOCUMENTS

| | | | |
|---|---|---|---|
| 2005/0028022 A1* | 2/2005 | Amano | G06F 11/1469 714/2 |
| 2005/0235016 A1 | 10/2005 | Amano et al. | |
| 2014/0115232 A1* | 4/2014 | Goss | G06F 11/1471 711/103 |
| 2016/0078044 A1* | 3/2016 | Diaconu | G06F 16/219 707/649 |
| 2016/0124669 A1* | 5/2016 | Harris | G06F 3/0619 711/162 |
| 2017/0300505 A1 | 10/2017 | Belmanu Sadananda et al. | |
| 2018/0067814 A1* | 3/2018 | Bish | G06F 11/1451 |
| 2020/0104251 A1* | 4/2020 | Boals | G06F 11/1471 |
| 2020/0364200 A1* | 11/2020 | Cseri | G06F 16/2358 |

OTHER PUBLICATIONS

"International Search Report and Written Opinion Issued in PCT Application No. PCT/US20/037969", dated Oct. 7, 2020, 10 Pages.

* cited by examiner

INCREMENTALLY UPDATING RECOVERY MAP DATA FOR A MEMORY SYSTEM

BACKGROUND

Recent years have seen a precipitous rise in the use of computing devices (e.g., mobile devices, personal computers, server devices, cloud computing systems) to receive, store, edit, transmit, or otherwise utilize digital data. For example, it is now common for individuals and businesses to store massive quantities of data on local computing devices and/or on remote cloud computing systems. Indeed, as demand for increased storage and memory capacity on computing devices increases, innovations in technology associated with storing and processing data has similarly improved and become more capable.

As memory and storage capacity has increased in size and complexity, ensuring that any data that needs to be persistent, but that currently resides in volatile media (e.g., memory) has become increasingly difficult. For example, as memory capacity increases, additional processing resources are often needed to capture and store a current state of memory for a memory system. In addition, where long periods of time may pass between a computing device capturing and storing a snapshot representative of a current state of memory, additional time is often needed to recover a current state of memory where large quantities of updates to the state of memory have occurred. Moreover, while many conventional systems may reduce recovery time by simply capturing snapshots of a memory state with greater frequency, capturing or otherwise generating snapshots for a memory system involves significant processing resources and accelerates media wear over time.

These and other problems exist with regard to facilitating fast and efficient recovery of a memory state for a memory system.

DETAILED DESCRIPTION

Figure 1:
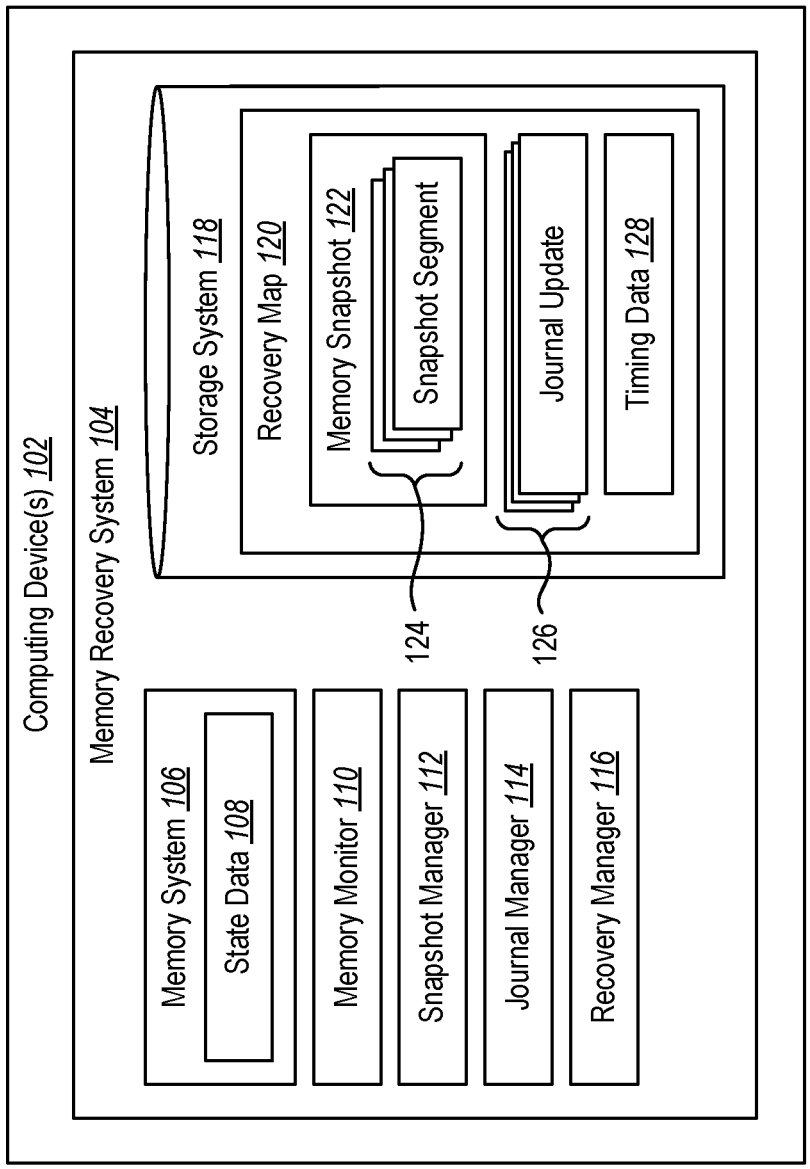
FIG. 1 illustrates an example computing device having a memory recovery system implemented thereon in accordance with one or more embodiments.

The present disclosure relates generally to a memory recovery system for generating and updating a recovery map including information that enables a computing device to recover a current state of memory for a memory system. In particular, as will be discussed in further detail below, the memory recovery system can maintain a recovery map including a periodically updated snapshot of a memory state for a memory system and associated journal updates indicating changes to the memory state between a most recent update and a more current state. Using an updated recovery map and journal updates, the memory recovery system can recover a current state of data at any time, such as in response to a power loss event (e.g., a pulled plug, a loss of battery power, or other unplanned power loss event). As will be discussed below, the memory recovery system may accomplish benefits described herein associated with periodic updates to portions of a recovery map in a variety of ways.

As a first example, the memory recovery system can receive, generate, or otherwise identify a recovery map including a memory snapshot. The memory snapshot may include a representation of a memory state for a memory system (e.g., a memory component of a storage system of a computing device) at a specific point in time (e.g., a time of a most recent update or when the memory snapshot was generated). The memory recovery system can further generate journal updates associated with changes (e.g., writes) to the memory state over a duration of time and add the journal updates to the recovery map. Based on a number of journal updates, the memory recovery system can periodically update the memory snapshot by generating updated portions of the memory snapshot to replace older or outdated portions or segments of the memory snapshot associated with corresponding portions of the memory system (e.g., the same range of logical block addresses (LBAs) or physical regions of memory hardware).

As another example, the memory recovery system can maintain a recovery map including a snapshot stream. The snapshot stream may include a plurality of segments representative of corresponding portions of a memory state for a memory system. The memory recovery system can further generate journal updates associated with changes to states of the memory system and add the journal updates to the recovery map. The memory recovery system can iteratively update segments of the snapshot stream based on timing checkpoints to maintain a recovery map having a current representation of memory states on the memory system. The memory recovery system can use the snapshot stream in combination with a selective set of journal updates to enable recovery of a current state of memory at any time and while limiting a time involved for recovering the current state of memory.

As will be discussed in further detail below, the present disclosure includes a number of practical applications having features and functionality described herein that provide benefits and/or solve provides associated with maintaining a recovery map that enables a computing device to recover a current state of memory at any time (e.g., in response to an unplanned power loss event). It will be understood that the below-described benefits are provided by way of example, and other benefits and/or solutions to various problems associated with maintaining a recovery map may similarly be accomplished using features and functionalities described herein.

For example, as will be discussed below, the memory recovery system can periodically update select portions of a memory snapshot over time. By periodically updating select portions of a memory snapshot, the memory recovery system can avoid scenarios in which the memory recovery has spent considerable resources to generate a new snapshot of a very large memory system only to experience a power loss event at an untimely moment (e.g., when the new snapshot is almost complete). In this case, rather than losing all progress, the memory recovery system only loses progress associated with a most recent segment or portion of a memory snapshot while still benefiting from previously updated portions of the recovery map.

In addition, in one or more embodiments, the memory recovery system provides greater flexibility associated with utilization of processing resources when updating the recovery map. For example, because the memory recovery system periodically updates select portions of the recovery map, the memory recovery system can reduce an allocation of processing resources to maintaining a current version of the memory snapshot. For instance, by maintaining a snapshot stream with periodic updates or by simply updating select portions (e.g., subsets) of the recovery map, the memory recovery system can generate memory snapshots at a lower frequency than conventional memory systems while ensuring that recovery time does not exceed a desired time threshold.

By reducing a frequency with which the memory recovery system generates or updates the recovery map, the memory recovery system can further reduce media wear as a result of performing updates of the entire recovery map at a lower frequency than conventional systems. For example, by updating select portions of the recovery map, the memory recovery system can reduce an overall frequency with which the entire memory snapshot is updated. This reduces a number of writes of recovery data to a storage system, which reduces media wear associated with repeatedly writing and re-writing recovery data to a storage system.

As illustrated in the foregoing discussion, the present disclosure utilizes a variety of terms to described features and advantages of the systems described herein. Additional detail is now provided regarding the meaning of some of these terms. As used herein, a "memory system" may refer any volatile or non-persistent memory of a computing device or system of computing devices. For instance, in one or more embodiments, a memory system refers to any random-access memory (RAM) usable by the computing device to perform reads, writes, or other actions such as storing memory that may be accessed by one or more processors (e.g., CPUs) of the computing device. The memory system may include various types of volatile memory including, by way of example, dynamic RAM (DRAM), synchronous DRAM (SDRAM), static RAM (SRAM), or any other type of non-persistent memory. The memory system may implemented on a personal computing device, such as a laptop or desktop computer or, alternatively, may refer to memory of a server device or devices of a cloud computing system.

In one or more embodiments described herein, the memory system may include a "memory state." As used herein, a "memory state" may refer to a state of memory at any point in time. A memory state may include any number of states for one or more memory elements (e.g., memory cells) within the memory system. Memory states may refer to binary states for each of the memory elements of the memory system. Memory states may additionally include combined memory states of multiple memory elements in various applications or on different types of memory hardware. In one or more embodiments, the memory state refers to a state of memory for all elements of the memory system. Alternatively, in one or more embodiments described herein, a memory state may refer to a state of memory elements corresponding to a specific portion or region of memory elements (e.g., a range of LBAs or select portion of an array of memory elements).

As used herein, a "recovery map" refers to a representation of a memory state for the memory system. The recovery map may include a memory snapshot including a recently captured representation of the memory state for the memory system. For example, a memory snapshot may refer to a most recently captured memory state and include any data to recreate or recover the memory state for the memory system as it existed at a point in time when the memory snapshot was generated. In one or more embodiments, the recovery map may include a flash translation layer (FTL) map and journal updates corresponding to a memory state of a memory system. For instance, in one or more embodiments, the snapshot may refer to an FTL map. Alternatively, the recovery map may refer to any block of metadata that includes a snapshot and journaling scheme in accordance with one or more embodiments described herein.

In one or more embodiments described herein, the memory snapshot includes discrete portions or segments that collectively make up a representation of the entire memory system. The portions or segments may include representations of multiple portions or segments of the memory state for the memory system corresponding to respective portions or regions of memory elements on the memory system. As will be discussed in further detail below, each of the snapshot portions may correspond to different times at which the respective snapshot portions were generated. Thus, multiple portions of a memory snapshot may include representations of memory states for different portions of the memory system as the respective portions of the memory system existed at the times when the snapshot portions were generated. For example, where a memory snapshot is divided into four snapshot portions, each of the snapshot portions may include representations of memory states for four corresponding portions of the memory system associated with four times at which the four snapshot portions were generated.

The portions of the memory snapshot may be divided in a number of ways. For example, the memory snapshot may include respective portions generated based on a number of changes (e.g., writes) made to the memory system. As another example, the memory snapshot may refer to a snapshot stream having snapshot segments divided based on timing checkpoints. Indeed, the memory snapshot may include any number of portions that are generated at varying frequencies in accordance with one or more embodiments described herein. Further detail in connection with various examples is provided below in connection with FIGS. 2-5E.

In addition to the memory snapshot, the recovery map may include any number of journal updates. As used herein, a journal update may include any information associated with a change to the memory system. For example, a journal update may include an indication of a write to the memory system and may include a value of the write as well as a timestamp associated with when the write was implemented. In one or more examples described herein, the journal updates provide any information to enable the memory recovery system to recreate a current state of memory in view of a most recent memory snapshot. For example, upon experiencing an unexpected power loss to a computing device, the memory recovery system can recover a current state of the memory system by combining a most current memory snapshot and any journal updates from the recovery map to recreate the state of the memory snapshot at a time of the unexpected power loss. In one or more embodiments, the journal updates refer to FTL log pages associated with a corresponding FTL map. Alternatively, the journal updates may refer to any data object that includes an indication of changes to the memory state of a corresponding block of memory.

Additional detail will now be provided regarding a memory recovery system for generating and updating portions of a recovery map to facilitate an efficient and accurate recovery of a current state of memory on computing device. For example, FIG. 1 illustrates an example computing device 102 including a memory recovery system 104 implemented thereon. As shown in FIG. 1, the memory recovery system 104 includes a memory system 106 and state data 108. As mentioned above, the memory system 106 may refer to any volatile or non-persistent memory device(s) on the computing device 102 having associated state data 108, which may include any information associated with memory states for the memory elements of the memory system 106. In one or more embodiments, the memory system 106 includes DRAM or other type of non-persistent memory.

The memory recovery system 104 may further include a memory monitor 110, a snapshot manager 112, a journal manager 114, and a recovery manager 116. As further shown, the memory recovery system 104 may include a storage system 118, which may include any non-volatile or persistent disk storage, and may include any type of non-volatile or persistent storage elements, such as NAND storage, flash storage, SSD devices, or any other similar type of storage elements. As will be discussed in further detail below, the storage system 118 may include a recovery map 120 stored thereon. The recovery map 120 may include any information that enables the memory recovery system 104 to recover a current state of memory for the memory system 106. As shown in FIG. 1, the recovery map 120 may include a memory snapshot 122, which may include a plurality of snapshot segments 124 or other discrete portions of the memory snapshot 122. The recovery map may also include a plurality of journal updates 126 and timing data 128. The timing data 128 may include data indicating times at which snapshot segments 124 of the memory snapshot 122 and journal updates 126 were initiated or otherwise generated. In particular, as will be discussed below, the snapshot manager 112 and the journal manager 114 may indicate times at which snapshot segments 124 and/or journal updates 126 were generated (or initiated).

The computing device 102 may refer to various types of computing devices. For example, the computing device 102 may refer to a server device, such as a server node or system of nodes on a network of interconnected server devices (e.g., a cloud computing system). In addition, or as an alternative, the computing device 102 may refer to a mobile device such as a mobile telephone, a smart phone, a personal digital assistant (PDA), a tablet, a laptop, or wearable computing device (e.g., a headset or smartwatch). The computing device 102 may further include one or more non-mobile devices such as a desktop computer, a server, or other non-portable device. The computing device 102 may include additional features and functionality described below in connection with FIG. 8.

FIG. 1 illustrates an example embodiment in which the memory recovery system 104 and associated components are implemented on a single computing device 102. For example, the memory recovery system 104 may be implemented on a single server device or personal computing device having the memory system 106 and storage system 118 implemented thereon. Alternatively, one or more components of the memory recovery system 104 may be implemented across multiple devices. For instance, in one or more embodiments, the memory recovery system 104 includes a memory system 106 implemented on a first device while one or more of the components 110-116 and/or storage system 118 are implemented on a second device (or multiple devices).

In one or more embodiments, each of the components of the memory recovery system 104 are in communication with one another using any suitable communication technologies. Additionally, the components of the memory recovery system 104 may be in communication with other devices. It will be understood that while the components of the memory recovery system 104 shown in FIG. 1 are shown to be separate in FIG. 1, any of the subcomponents may be combined into fewer components, such as into a single component, or divided into more components as may serve a particular embodiment.

The components (e.g., 106-118) of the memory recovery system 104 may include software, hardware, or both. For example, the components of the memory recovery system 104 can include one or more instructions stored on a computer-readable storage medium and be executable by processors of one or more computing devices. When executed by the one or more processors, the computer-executable instructions of the memory recovery system 104 can cause the computing device 102 to perform the methods described herein. Alternatively, the components of the memory recovery system 104 can comprise hardware, such as a special-purpose processing device to perform a certain function or group of functions. Additionally, or alternatively, the components of the memory recovery system 104 can include a combination of computer-executable instructions and hardware.

In accordance with one or more embodiments discussed above, the memory recovery system 104 can generate and periodically update the recovery map 120 including a representation of the state data 108 on the memory system 106. For example, the memory monitor 110 may monitor the state data 108 to track any writes or other modifications to the state data 108 that changes a memory state for the memory system 106. This may include tracking any number of reads, writes, or any other action performed by the computing device 102 that affects or alters the state data 108 of the memory system 106. The memory monitor 110 may additionally track and log or otherwise indicate timing of any reads, writes, or other actions performed by the computing device 102. The memory monitor 110 may provide corresponding timing information to the storage system 118 and/or write the timing information itself to memory of the memory system 106.

As shown in FIG. 1, and as will be discussed in further detail below, the memory recovery system 104 includes a snapshot manager 112. The snapshot manager 112 may capture a memory snapshot 122 representative of a current state of memory (e.g., a current state of the state data) for the memory system 106 at any point in time. The snapshot manager 112 may capture a memory snapshot 122 representative of an initial memory state (e.g., upon turning on or starting up the computing device 102). In one or more embodiments, the snapshot manager 112 captures a memory snapshot 122 representative of a final memory state corresponding to a state of memory when the computing device 102 is shutdown (e.g., a planned shutdown) or upon experiencing a planned power loss event (e.g., an event that provides sufficient time to generate an up-to-date snapshot and transfer the snapshot to the storage system 118).

In addition to capturing a memory 122 snapshot representative of a memory state for an entire allocation of memory for the memory system 106, the snapshot manager 112 may periodically update discrete portions (e.g., subsets) of the memory snapshot 122. For example, in one or more embodiments, the snapshot manager 112 identifies discrete portions of memory from the memory system 106 such as discrete ranges of LBAs, physical regions of memory elements from the memory system 106 or other definable portions of the memory system 106 that the snapshot manager 122 may use in capturing or otherwise generating a snapshot (e.g., a snapshot segment) for a respective subset of the memory system 106.

Upon identifying portions of the memory system 106, the snapshot manager 112 may generate snapshot updates for respective portions of the memory system 106. For example, in one or more implementations, the snapshot manager 112 selectively updates the memory snapshot 122 by identifying state data 108 for a specific portion of the memory system 106 and updating a snapshot segment for the identified portion(s) of the memory system 106. As will be discussed in further detail below in connection with FIGS. 2-3, the snapshot manager 112 may update a selective segment or portion of the memory snapshot 122 by generating an updated snapshot segment representative of a memory state for a portion of the memory system 106 that has least recently been updated relative to other portions of the memory snapshot 122.

In one or more embodiments, the memory snapshot 122 includes a snapshot stream having snapshot segments 124 that are updated at regular or irregular timing checkpoints. In one or more embodiments, the snapshot manager 112 continually updates snapshot segments 124 over a period of time between two subsequent checkpoints and, at each checkpoint, discards a least recent snapshot segment corresponding to the same portion of the memory system 106 as the recently updated snapshot segment. Further detail in connection with generating and updated a memory snapshot 122 that includes a snapshot stream is discussed below in connection with FIGS. 4-5E.

As further shown, the memory recovery system 104 may include a journal manager 114. As discussed above, the recovery map 120 may include a number of journal updates 126 corresponding to changes to the state data 108 between a time that the memory snapshot 122 (e.g., a specific portion of the memory snapshot 122) has been updated and a current time. For example, based on detected changes to the state data 108, the journal manager 114 may generate journal updates indicating a change in a state of memory for one or more memory elements of the memory system 106 and an associating timing of the change. As shown in FIG. 1, the journal manager 114 may store the associated timing data 128 (e.g., timestamps) associated with each journal update within the recovery map 120. Timing of the journal updates may be stored within the timing data 128 together with timestamps for each snapshot segment of the plurality of snapshot segments 124 indicating a time at which each snapshot segment was initiated or otherwise generated.

As mentioned above, the information from the recovery map 120 may be utilized by the memory recovery system 104 to recover a most recent state of memory for the memory system 106. In particular, as shown in FIG. 1, the memory recovery system 104 may include a recovery manager 116 configured to recover a memory state at any specific point in time. For example, the recovery manager 116 may reconstruct the state data as it existed at a certain point in time, such as at a time of unexpected power loss to the computing device 102. In one or more embodiments, the recovery manager 116 recovers a memory state by identifying a most recent or updated memory snapshot 122. The recovery manager 116 may additionally modify data indicated within the most recent memory snapshot 122 by applying each of the journal updates 126 to the memory snapshot 122. In one or more implementations, the recovery manager 116 may iteratively apply each of the journal updates 126 included within the recovery map 120 having timing data 128 (e.g., timestamps) up through a time of the power loss event (or other event or timing that prompts recovery of a given memory state for the memory system 106.

Figure 2:
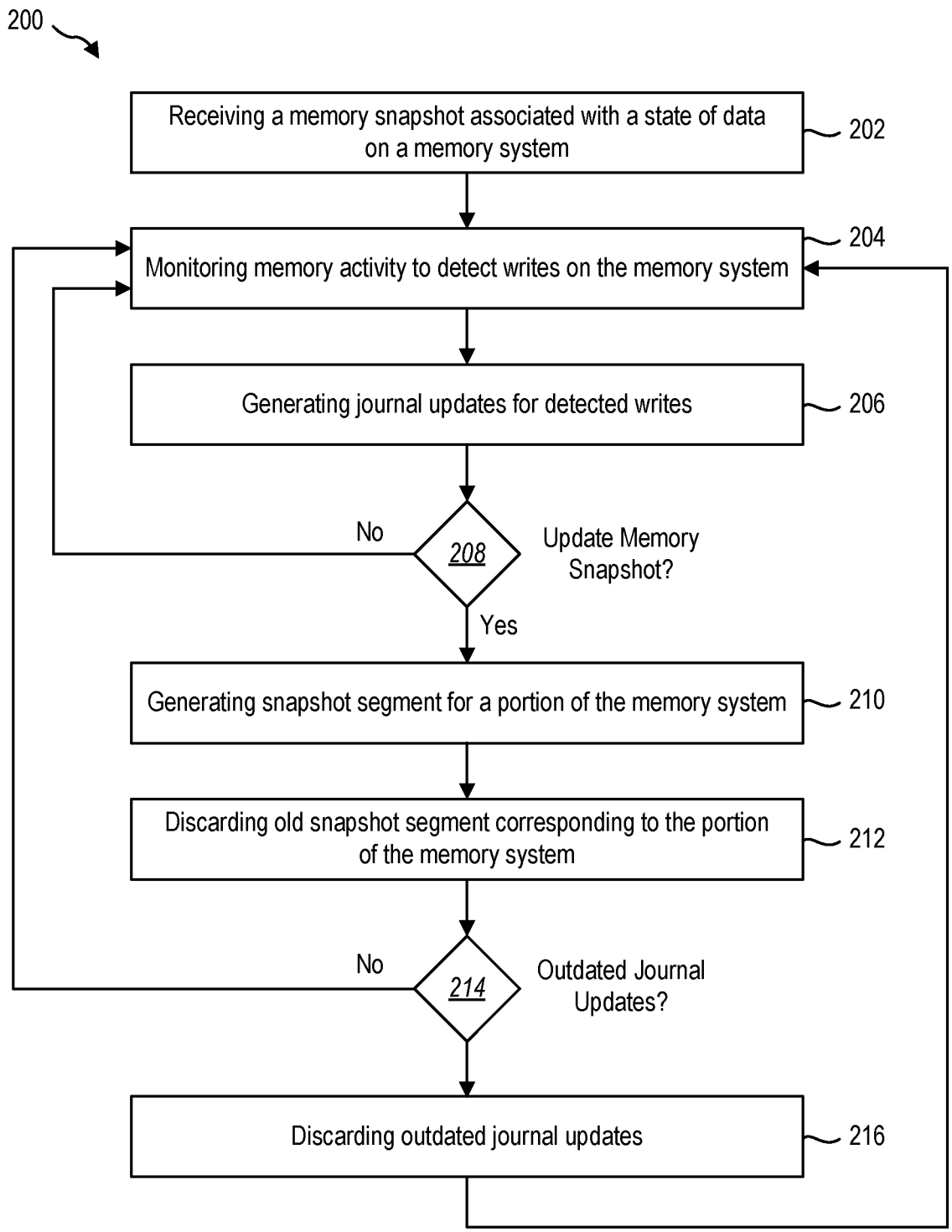
FIG. 2 illustrates an example workflow for generating and updating a recovery map in accordance with one or more embodiments.

FIG. 2 provides an example workflow 200 indicating a series of acts for maintaining an updated recovery map 120 in accordance with one or more embodiments described herein. As shown in FIG. 2, the memory recovery system 104 may perform an act 202 of receiving a memory snapshot associated with a state of memory on a memory system 106. For example, the memory recovery system 104 can capture an initial memory snapshot 122 (e.g., upon turning on the computing device 102). In one or more embodiments, the memory recovery system 104 receives a previously generated snapshot representative of a current state or a most recent state of memory on the memory system 106. As an example, where the memory recovery system 104 generates a memory snapshot 122 prior to shutting down the computing device 102 (e.g., a planned shutdown), the memory recovery system 104 may receive the most current memory snapshot 122 upon powering on the computing device 102.

As further shown in FIG. 2, the memory recovery system 104 can perform an act 204 of monitoring memory activity to detect writes (or other changes) on the memory system 106. The memory recovery system 104 can monitor any type of activity on the memory system 106 such as reads, writes, accesses, or any other activity that affects a current state of the state data 108 on the memory system 106.

In response to detecting any changes to the state data 108, the memory recovery system 104 can perform an act 206 of generating journal updates for detected writes (or other changes) to the memory system 106. As mentioned above, the memory recovery system 104 can generate one or more journal updates for each write to the memory system 106. Each of the journal updates may include any information needed to enable the memory recovery system 104 to determine a current state of state data 108 between a time at which the most recent memory snapshot 122 was captured (e.g., a time at which the most recent update to one or more snapshot segments 124 was made) and a current time. In addition, each of the journal updates may include a timestamp or other timing information 128 to indicate a time at which the journal update was created and/or a time when the detected write on the memory system 106 occurred.

The memory recovery system 104 may additionally perform an act 208 of determining whether to update the memory snapshot 122. The memory recovery system 104 may determine whether to update the memory snapshot 122 based on a number of factors. In one or more embodiments, the memory recovery system 104 determines to update the memory snapshot 122 based on a period of time that has passed between subsequent updates. In one or more embodiments, the memory recovery system 104 determines to update the memory snapshot 122 based on a received input or request to generate an updated memory snapshot 122.

In one or more embodiments, the memory recovery system 104 determines to update the memory snapshot 122 based on a number of journal updates that have been generated and added to a recovery map 120. For instance, to ensure that the memory recovery system 104 is able to recover a current state under a threshold period of time, the memory recovery system 104 may determine to update the memory snapshot 122 to avoid having a threshold number of journal updates 126 within the recovery map 120. Accordingly, the memory recovery system 104 may determine to update the memory snapshot 122 based on a total number of journal updates 126 within the recovery map 120 or, alternatively, based on a number of journal updates 126 that have been generated and added to the recovery map 120 since performing a most recent update of the memory snapshot 122.

Where the memory recovery system 104 determines not to update the memory snapshot 122, the memory recovery system 104 can return to act 204 and further monitor memory activity of the memory system 106. Alternatively, where the memory recovery system 104 determines to update the memory snapshot 122, the memory recovery system 104 can perform an act 210 of generating a snapshot segment for a corresponding portion of the memory system 106. In particular, rather than updating the entire memory snapshot 122, the memory recovery system 104 can update a select portion (e.g., a snapshot segment) corresponding to a subset of memory elements (e.g., a range of LBAs, a discrete region of memory hardware) from the memory system 106.

In one or more embodiments, the memory recovery system 104 selectively updates a snapshot segment corresponding to the least recently updated portion of the memory snapshot 122. For example, the memory recovery system 104 can evaluate timing data 128 for the plurality of snapshot segments 124 to identify which of the snapshot segments 124 has been least recently updated. The memory recovery system may then selectively update one or more of the least recently updated snapshot segments by capturing a current state of memory for the corresponding portions of the memory system 106. The memory recovery system 104 may further update the memory snapshot 122 by adding the updated snapshot segment to the recovery map 120.

Upon generating or otherwise updating the snapshot segment, the memory recovery system 104 can further perform an act 212 of discarding an old snapshot segment(s) corresponding to the portion of the memory system 106 as the new snapshot segment(s) that has been updated. In particular, in response to generating one or more new snapshot segments, the memory recovery system 104 can discard any number of outdated snapshot segments corresponding to the same portion(s) of the memory system 106.

As shown in FIG. 2, the memory recovery system 104 may perform an act 214 of determining whether the recovery map 120 includes one or more outdated journal updates. In particular, the memory recovery system 104 may determine whether one or more journal updates form a set of journal updates 126 currently in the recovery map 120 have timing data 128 (e.g., timestamps) that pre-date the outdated snapshot segment(s) that has been discarded from the recovery map 120. While the recovery map 120 may include one or more outdated journal updates with each iterative update of the memory snapshot 122 to be discarded, in one or more embodiments, the set of journal updates 126 may all be current when performing a first set of iterative updates of the snapshot segments 124, as will be discussed by way of example in connection with FIG. 3. In this scenario (e.g., when the recovery map 120 does not include any outdated journal updates), the memory recovery system 104 may return to monitoring additional memory activity in connection with the memory system 106.

Alternatively, in response to determining that one or more outdated journal updates exist within the memory map 120, the memory recovery system 104 may perform an act 216 of discarding the outdated journal updates. For example, the memory recovery system 104 can remove any journal updates from the recovery map 120 having timing data 128 that pre-dates a least recent snapshot segment that was discarded from the recovery map. In particular, as will be discussed by way example below, the memory recovery system 104 may discard any journal updates that include information that is captured or otherwise included within a current set of snapshot segments 124 within the recently updated memory snapshot 122.

Figure 3:
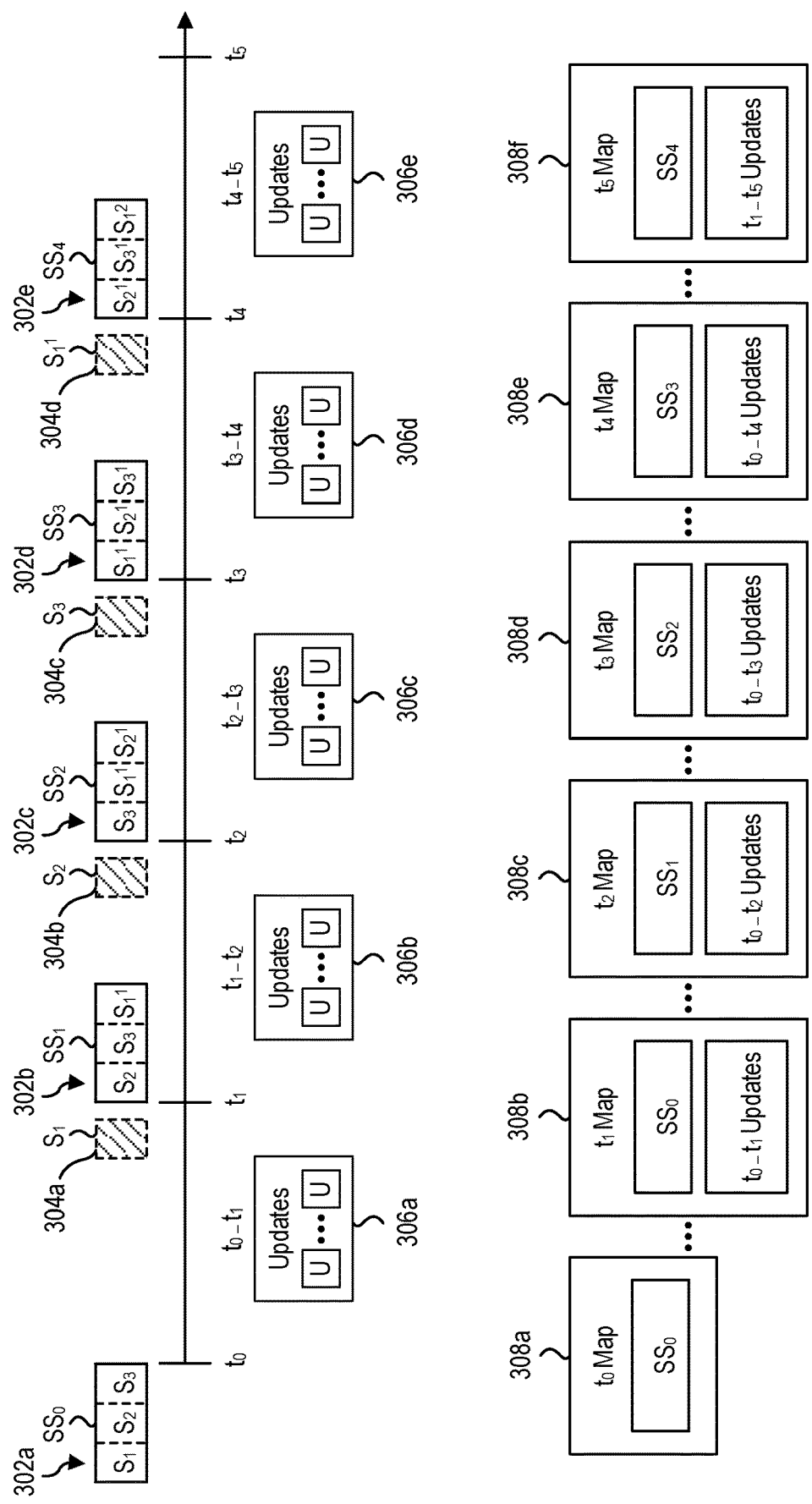
FIG. 3 illustrates an example timeline showing updates to a recovery map in accordance with one or more embodiments.

FIG. 3 provides an example illustration of features and functionality in connection with iteratively updating a recovery map 120 in accordance with one or more embodiments described herein. In particular, FIG. 3 illustrates an example memory snapshot ($SS_0$) 302a at an initial time ($t_0$) representative of a state of memory at the initial time ($t_0$). The initial memory snapshot ($SS_0$) 302a may include snapshot segments $S_1$, $S_2$, and $S_3$ corresponding to respective portions of the memory system 106. As further shown, a $t_0$ map (e.g., a recovery map at the initial time ($t_0$)) includes the initial memory snapshot ($SS_0$) 302a with no journal updates. As shown in FIG. 3, the memory recovery system 104 may receive or otherwise generate an initial recovery map ($t_0$ map 308a) representative of the state of memory on the memory system 106 at $t_0$.

As time progresses, the memory recovery system 104 may generate a first set of journal updates 306a between $t_0$ and $t_1$. In accordance with examples discussed above, the memory recovery system 104 can continue to generate journal updates until a first time ($t_1$). For example, after the first set of journal updates 306a exceeds a threshold number of updates and/or after a threshold duration of time has passed, the memory recovery system 104 may perform a first update of the recovery map 120. As shown in FIG. 3, at the first time ($t_1$) and prior to or at the commencement of initiating the update, a $t_1$ map 308b includes the initial snapshot ($SS_0$) in addition to the first set of journal updates 306a.

As further shown, the memory recovery system 104 may perform an update of the initial memory snapshot ($SS_0$) 302a by generating a first new segment ($S_1^1$) and appending the new segment to segments $S_2$ and $S_3$ to generate a first updated memory snapshot ($SS_1$) 302b. The memory recovery system 104 may then discard a first outdated portion ($S_1$) 304a of the first updated memory snapshot 302b corresponding to the same portion of memory from the memory system 106 as the new segment ($S_1^1$). As shown in FIG. 3, the memory recovery system 104 may continue generating a second set of journal updates 306b and adding the journal updates 306b to the recovery map. The memory recovery system 104 may generate any number of journal updates up to a second time ($t_2$) when the memory recovery system 104 determines that another iterative update of the recovery map is to be performed.

As shown in FIG. 3, a $t_2$ map 308c (e.g., the recovery map just before initiating a second map update) includes the $t_1$ memory snapshot ($SS_1$) 302b in addition to the first two sets of journal updates 306a-b representative of updates to the memory system 106 between the initial time ($t_0$) and the second time ($t_2$). In one or more embodiments, the duration between the initial time ($t_0$) and the first time ($t_1$) is the same or approximately the same as the duration between the first time ($t_1$) and the second time ($t_2$). Alternatively, in one or more embodiments, the duration between the different timings is based on a number of journal updates that trigger updates of portions of the recovery map. Accordingly, each incremental time shown in FIG. 3 may be different depending on a number and frequency of the journal updates.

The memory recovery system 104 may continue to iteratively update the recovery map at incremental steps, as shown in FIG. 3. For example, as shown in FIG. 3, upon updating the memory snapshot at second time ($t_2$), a second updated memory snapshot ($SS_2$) 302c may include the initial third segment ($S_3$) and updated first and second segments ($S_1^1$ and $S_2^1$). The memory recovery system 104 may further discard an outdated second segment ($S_2$) corresponding to the same portion of the memory system 106 as the new added segment ($S_2^1$). As further shown, the memory recovery system 104 may generate a third set of journal updates 306c between the second time ($t_2$) and a third time ($t_3$) where the memory recovery system 104 determines that another update should be performed. As shown in FIG. 3, at the third time ($t_3$), a $t_3$ map 308d may include the second updated memory snapshot ($SS_2$) 302c and the three sets of journal updates 306a-c representative of changes to the memory system between $t_0$ and $t_3$.

As further shown, the memory recovery system 104 may generate a third updated memory snapshot ($SS_3$) 302d including updated snapshot portions $S_1^1$, $S_2^1$, and $S_2^1$. In generating the third updated memory snapshot ($SS_3$) 302d, the memory recovery system 104 may further discard outdated segment ($S_3$) 304c replaced by a new segment representative of a more current state of memory for the same portion of the memory system 106. The memory recovery system 104 may continue generating and adding a fourth set of journal updates 306d to a current version of the recovery map until a fourth time ($t_4$) when the memory recovery system 104 determines to perform another iterative update of the memory snapshot.

As shown in FIG. 3, at the fourth time ($t_4$) and prior to initiating the snapshot update, a $t_4$ map 308e includes the third updated memory snapshot ($SS_3$) in addition to the first four sets of journal updates 306a-d representative of changes to the memory system 106 between the initial time ($t_0$) and the fourth time ($t_4$). The memory recovery system 104 may update the memory snapshot by generating a fourth updated memory snapshot 302e including snapshot segments $S_2^1$, $S_3^1$, and $S_1^2$. The memory recovery system 104 may further discard now outdated segment ($S_1$) 304d replaced by more current segment ($S_1^2$) representative of a more current memory state of the same portion of the memory system 106.

At this point and with iterative updates to the memory map, the memory recovery system 104 may begin discarding one or more outdated journal updates from the recovery map. For example, prior to the fourth time ($t_4$), none of the journal updates were outdated as none of journal updates pre-dated the discarded snapshot segments 304a-d at the time of initiating the respective snapshot updates. Nevertheless, upon generating (e.g., completing generation of) the fourth updated memory snapshot ($SS_4$) 302e, the memory recovery system 104 may determine that the first set of journal updates 306a is outdated as each of the most current snapshot segments $S_2^1$, $S_3^1$, and $S_1^2$ each include memory state data 108 representative of the information contained within the first set of journal updates 306a. Accordingly, at a fifth time, and after generating a fifth set of journal updates 306e (and discarding outdated journal updates having timestamps that pre-date the first time ($t_1$)), a $t_5$ recovery map 308f may include the fourth updated memory snapshot 302e and the journal updates between the first time ($t_1$) and the fifth time ($t_5$).

The features and functionalities described in connection with FIG. 3 are provided by way of example and not limitation. For example, the memory recovery system 104 may perform any number of iterative updates to the recovery map that involve updating the memory snapshot and removing outdated journal updates. Moreover, while FIG. 3 shows an example including three discrete portions of the memory snapshot, the memory recovery system 104 may include any number of snapshot segments. Moreover, the memory recovery system 104 may perform updates at different threshold numbers of journal updates in accordance with one or more embodiments described herein.

Figure 4:
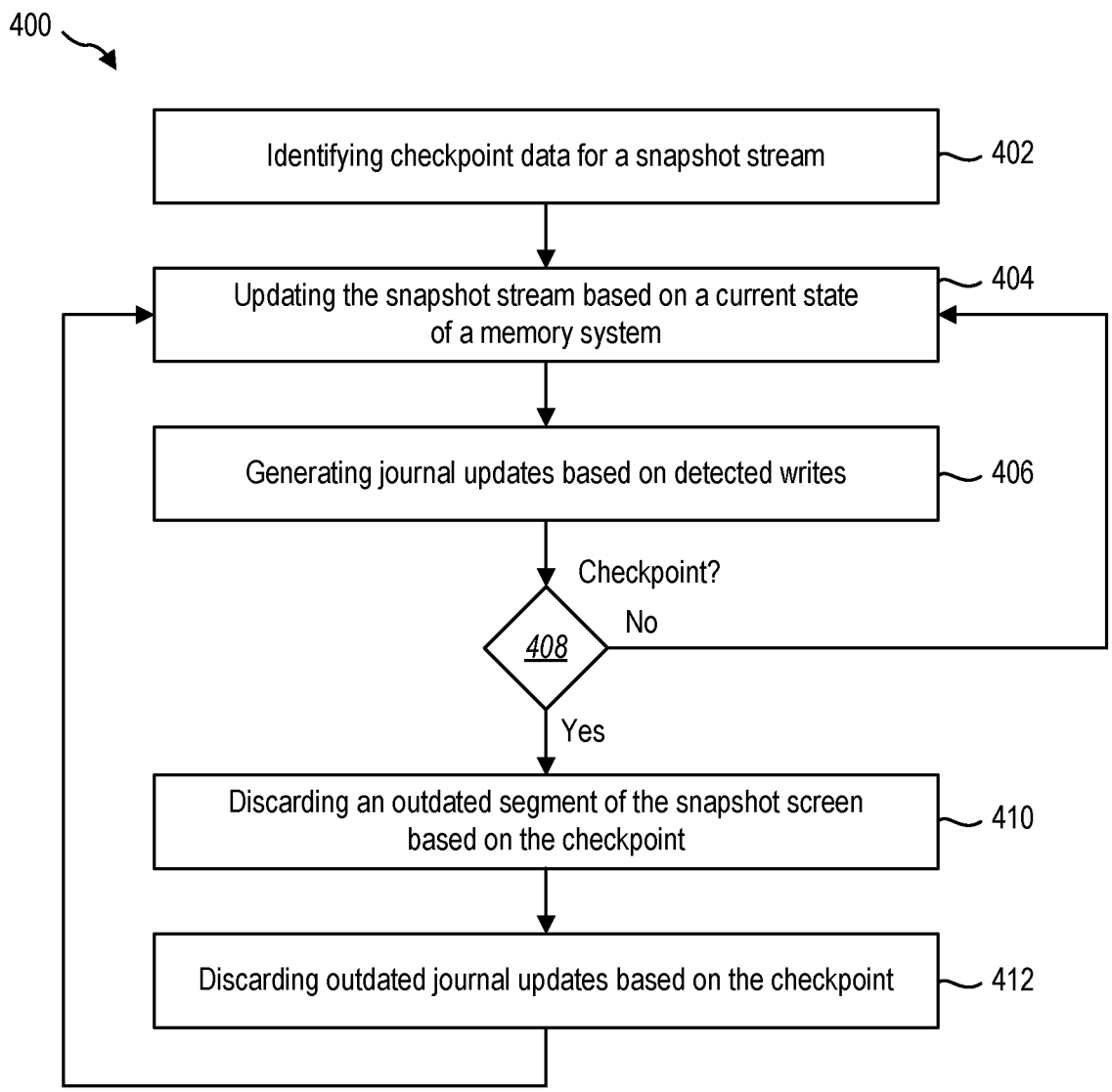
FIG. 4 illustrates another example workflow for generating and updating a recovery map in accordance with one or more embodiments.

FIG. 4 illustrates another example implementation in which the memory recovery system 104 iteratively updates a recovery map in accordance with similar principles as discussed above in connection with one or more embodiments. In particular, FIG. 4 illustrates an example workflow 400 including a series of acts for iteratively updating a snapshot stream in accordance with a number of checkpoints (e.g., timing checkpoints). In particular, FIG. 4 illustrates an example in which the memory recovery system 104 generates and updates a snapshot stream including segments that may be continually generated or updated over time at regular timing intervals. The snapshot stream may refer to an example memory snapshot 122 as discussed above in connection with one or more embodiments. While FIGS. 2-3 and FIGS. 4-5E are described as different examples, one or more features discussed above in connection with FIGS. 2-3 may similarly apply to one or more embodiments described in connection with FIGS. 4-5E (and visa versa).

As shown in FIG. 4, the memory recovery system 104 may perform an act 402 of identifying checkpoint data for a snapshot stream. In one or more embodiments, the memory recovery system 104 determines a frequency for updating the snapshot stream. For example, the memory recovery system 104 may determine fixed intervals at which the memory recovery system 104 updates segments of the snapshot stream and discards one or more outdated journal updates. Alternatively, the memory recovery system 104 may determine a threshold number of journal updates between each iterative update of the snapshot stream.

The memory recovery system 104 may identify the checkpoint data based on a number of considerations. For example, in one or more embodiments, the memory recovery system 104 determines a duration between checkpoints based on a quantity of processing resources to be allocated for maintaining and updating the recovery map. For instance, the memory recovery system 104 may determine a higher duration of time between checkpoints in order to use fewer processing resources of the computing device 102. Alternatively, the memory recovery system 104 may determine a lower duration of time between checkpoints to ensure that a time for recovering a current state of the memory system 106 can be done within a threshold period of recovery time. In one or more embodiments, the memory recovery system 104 identifies checkpoint data based on user-provided parameters (e.g., user settings) and/or based on available processing resources for the computing device 102 for performing a variety of other tasks.

As shown in FIG. 4, the memory recovery system 104 can perform an act 404 of updating the snapshot stream based on a current state of the memory system 106. For example, the memory recovery system 104 may update the entire snapshot stream or a discrete segment of the snapshot stream to reflect a current state of the memory system 106. Where the computing device 102 is recently turned on, the memory recovery system 104 may update the snapshot stream by generating a new snapshot stream representative of a current state of all the memory of the memory system 106. Alternatively, in one or more embodiments, the memory recovery system 104 updates a least recently updated portion of the snapshot stream to reflect a corresponding portion of the memory system 106, as discussed above in accordance with one or more embodiments.

The memory recovery system 104 may further perform an act 406 of generating journal updates based on detected writes (or other changes) to the memory system 106. This act 406 may be similar to act 206 discussed above in connection with FIG. 2. For example, similar to FIG. 2, the memory recovery system 104 may monitor memory activity and generate one or more journal updates in response to detecting each modification to a state of one or more memory elements of the memory system 106.

As shown in FIG. 4, the memory recovery system 104 may perform an act 408 of detecting a checkpoint. For example, the memory recovery system 104 may determine whether a threshold period of time has passed since performing a recent update of the snapshot stream. In addition, or as alterative, the memory recovery system 104 may detect a checkpoint based on a number of journal updates that have been recently generated or upon a total number of journal updates included within the recovery map.

In one or more embodiments, the memory recovery system 104 detects a checkpoint based on a projected time that it would take for the memory recovery system 104 to recover a current state of memory for the memory system 106. For example, where a computing device 102 includes high processing capabilities (and is capable of processing journal updates at a higher rate than devices having more limited processing capabilities), the memory recovery system 104 may detect a checkpoint based on a larger number of journal updates than other computing systems. Alternatively, where the computing device 102 has limited processing capabilities and may require more time to reconstruct a current state of memory for a memory system 106, the memory recovery system 104 may detect a checkpoint based on a smaller number of journal updates than other computing systems. Moreover, the memory recovery system 104 may detect a checkpoint based on a size (e.g., number of memory elements having corresponding memory states) of the memory system 104 and based on a time that the memory recovery system 104 may take to recover a current state of the memory system 106.

Where the memory recovery system 104 does not detect a checkpoint, the memory recovery system 104 may return to the act 404 of updating the snapshot stream based on the current state of the memory system 106. For example, the memory recovery system 104 may continue updating the recovery map to include recent journal updates. In addition, where the memory recovery system 104 is in the process of generating a segment of the snapshot stream, the memory recovery system 104 may continue generating the new segment while further monitoring changes to the memory system 106. Additional detail in connection with generating segments while processing journal updates is discussed below in relation with FIGS. 5A-5E.

Alternatively, where the memory recovery system 104 detects a checkpoint, the memory recovery system 104 may perform an act 410 of discarding an outdated segment of the snapshot screen based on the checkpoint. As mentioned above, in one or more embodiments, the memory recovery system 104 may gradually update segments of the snapshot stream by iteratively updating portions of the snapshot stream over time. In one or more embodiments, the memory recovery system 104 constantly updates a new portion (e.g., a snapshot segment) of the snapshot stream associated with a corresponding portion of the memory system 104 and then discards an outdated segment corresponding to the same portion of the memory system 104. Thus, in one or more embodiments, the memory recovery system 104 may update the snapshot stream on a loop, which will be discussed in further detail below in connection with FIGS. 5A-5E.

Upon discarding the outdated segment of the snapshot screen, the memory recovery system 104 may additionally perform an act 412 of discarding journal updates based on the checkpoint relative to a current replay window of the snapshot stream. For example, the memory recovery system 104 can discard any journal updates outside an active viewing window of the snapshot segment, referring to a duration of time between a first checkpoint of the snapshot stream and a current time. In particular, the memory recovery system 104 may discard any journal updates having timestamps that pre-date a first checkpoint corresponding to a least recent segment of the snapshot stream that has yet to be discarded from the current version of the snapshot stream. Further detail is provided by way of example in connection with FIGS. 5A-5E.

After discarding the outdated segment of the snapshot screen and discarding any outdated journal entries from the recovery map, the memory recovery system 104 can return to the act 404 of updating the snapshot stream based on the current state of the memory system 106. As will be discussed below, the memory recovery system 104 can iteratively update the snapshot stream and corresponding journal entries of the recovery map by looping through acts 404-412 any number of times until detecting a power loss event or other event that causes the memory recovery system 104 to recover a current state of the memory system 106.

FIGS. 5A-5E illustrates an example implementation of the memory recovery system 104 in connection with maintaining and iteratively updating a snapshot stream in accordance with one or more embodiments described herein. In particular, FIGS. 5A-5E illustrates an example snapshot stream including two segments having a viewing window that spans two equally spaced durations over two checkpoints. This illustration is provided by way of example and not limitation. It will be understood that snapshot streams may include any number of segments corresponding to any number of checkpoints. Moreover, the segments may be associated with different durations of time or different numbers of journal updates.

Figure 5A:
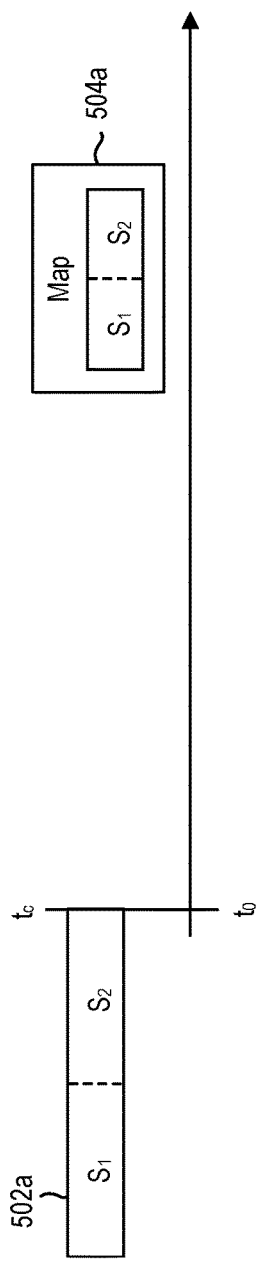
FIGS. 5A-5E illustrates example updates to a recovery map at different checkpoints along an example timeline in accordance with one or more embodiments.

FIG. 5A illustrates an initial snapshot stream 502a at an initial time ($t_0$) (e.g., corresponding to a current time ($t_c$) in the example shown in FIG. 5A). The initial snapshot stream 502a includes a first segment ($S_1$) and a second segment ($S_0$) including data corresponding to respective portions of the memory system 106. Each of the segments may refer to equally sized portions of memory from the memory system 106. Alternatively, the segments may refer to two discrete portions of the memory system 106 having different sizes (e.g., different ranges of LBAs or different numbers of memory elements). In one or more embodiments, the initial snapshot stream 502a represents the snapshot stream as initially generated by the memory recovery system 104 (e.g., upon turning on a device or other event that triggers capturing a memory snapshot representative of the entire memory system 106). As shown in FIG. 5A, the $t_0$ recovery map 504a includes the initial snapshot stream and no journal updates.

As discussed above, the memory recovery system 104 may continually update portions of the snapshot stream over time. For instance, upon hitting each checkpoint, the memory recovery system 104 may initiate updating a next segment of the snapshot stream and continue updating the segment of the snapshot stream until hitting the next checkpoint. Thus, while the segments may be associated with fixed portions of the memory system 106, in one or more embodiments, the memory recovery system 104 simply initiates updating a portion of the snapshot stream and continues updating the snapshot stream by running through rows, columns, or other portions of the memory system 106 until hitting a next checkpoint. The memory recovery system 104 may then discard an outdated portion of the snapshot stream (and associated journal updates) based on a quantity of the memory system 104 that was captured within the most recent segment of the snapshot stream.

Figure 5B:
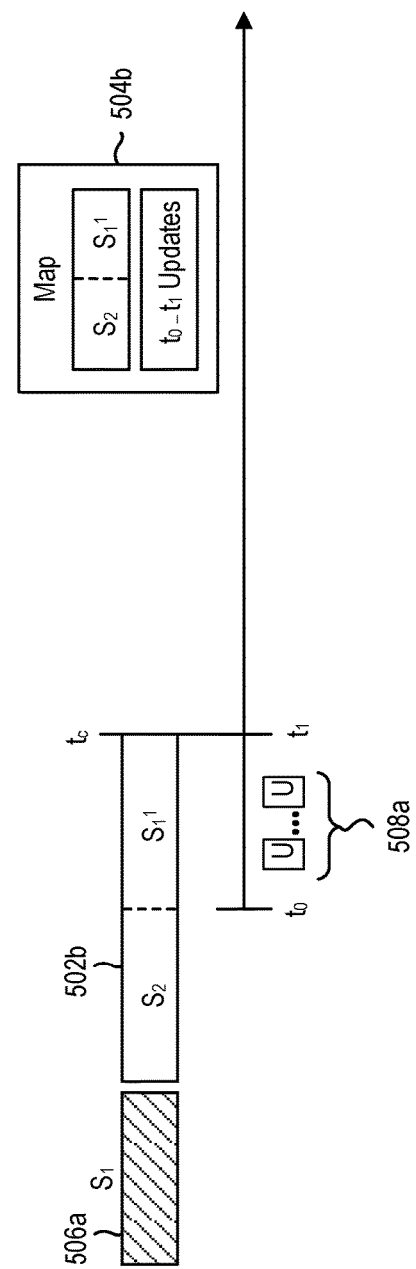

FIG. 5B illustrates an updated snapshot stream 502b where a current time ($t_c$) is at a first time ($t_1$) corresponding to a first checkpoint. As discussed above, the memory recovery system 104 may generate journal updates 508a including any updates to the memory system 106 between the initial time ($t_0$) and the current time ($t_c$). In response to detecting the first checkpoint at $t_1$, the memory recovery system 104 can further update the snapshot stream 502b by discarding a first outdated segment ($S_1$) 506a corresponding to a first portion of the memory system 106 as the newly created first segment ($S_1^1$). As mentioned above, the memory recovery system 104 may continually update the snapshot stream 502b between the initial time ($t_0$) and the first checkpoint ($t_1$). As shown in FIG. 5B, the $t_1$ recovery map 504b may include the updated snapshot 502b and journal updates added between the initial time ($t_0$) and the current time ($t_c$) (corresponding to $t_1$).

Figure 5C:
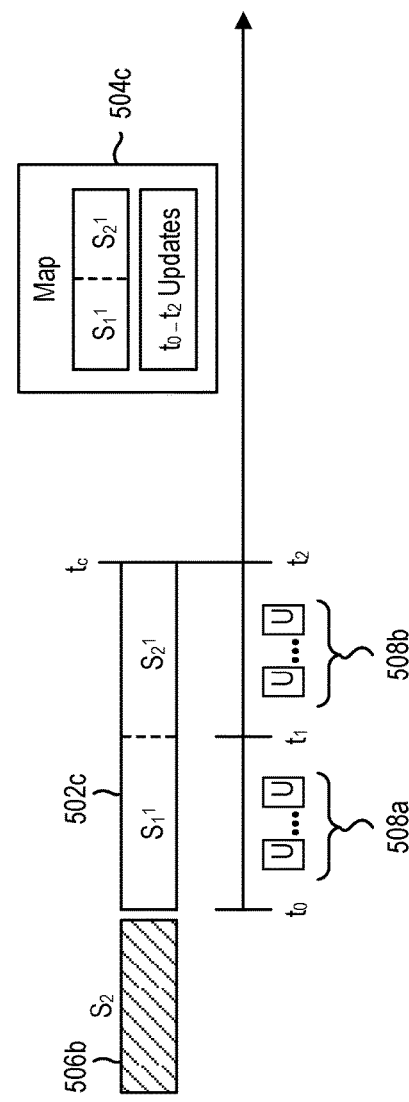

The memory recovery system 104 can continue updating the snapshot stream as shown in FIG. 5C. In particular, FIG. 5C illustrates another updated snapshot stream 502c where a current time ($t_c$) is at a second time ($t_2$) corresponding to a second checkpoint. As shown in FIG. 5C, the snapshot stream includes a second updated segment ($S_2^1$) to replace a second outdated segment ($S_2$) 506b removed from the snapshot stream based on detecting that the second checkpoint. As further shown, the memory recovery system 104 may generate a second set of journal updates 508b indicating changes to the memory state between the first time ($t_1$) and second time ($t_2$) corresponding to the first two checkpoints. As further shown, the $t_2$ recovery map 504c including the updated snapshot stream 502c and the sets of journal updates between $t_0$ and $t_2$ (e.g., the current replay window of the snapshot stream).

As discussed herein, the "replay window" refers to a current range of snapshot segments including information for recovering a current memory state for the memory system 106. For example, a replay window may include an initial checkpoint corresponding to a current version of the snapshot stream included within a current version of the recovery map. As shown in FIGS. 5A-5E, the replay window may change at each subsequent checkpoint based on a portion of the snapshot stream being replaced by an updated portion. Further information is provided by way of example below.

Figure 5D:
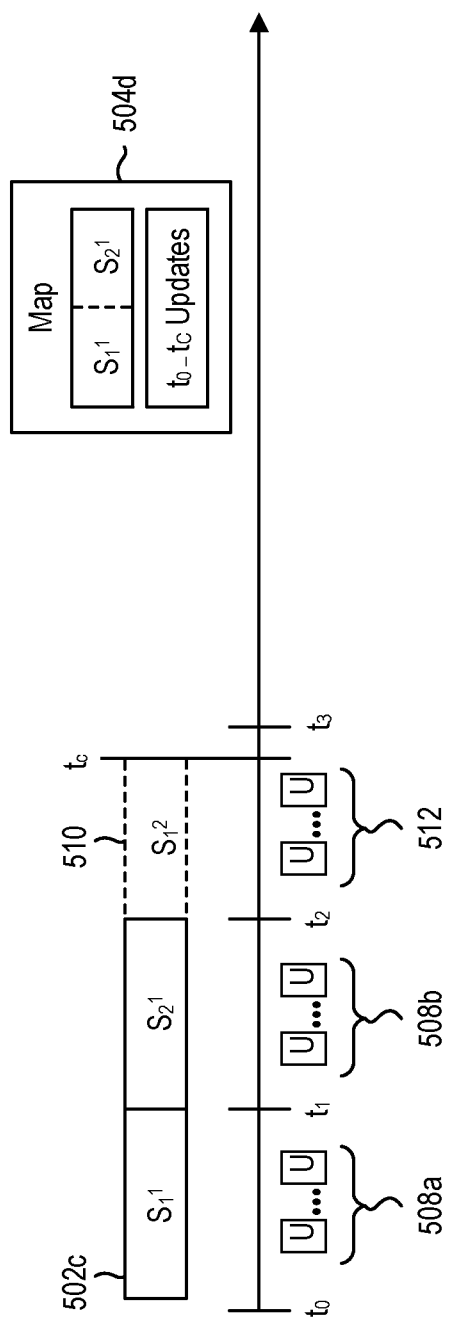
Figure 5E:
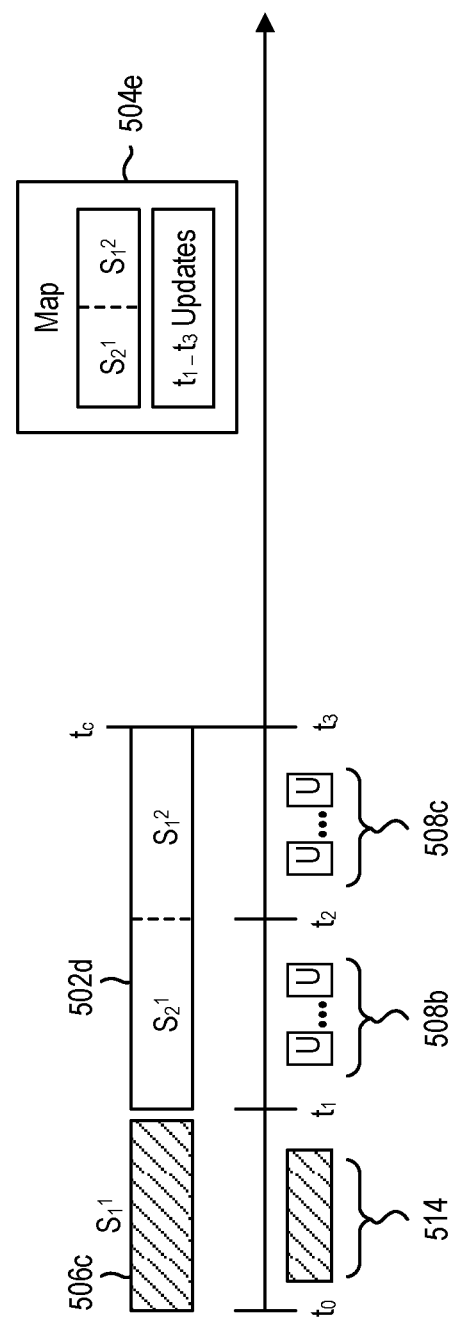

FIG. 5D illustrates an example implementation showing a current time ($t_c$) prior to a third checkpoint at a third time ($t_3$). In particular, as discussed above in connection with FIG. 4, the memory recovery system 104 may continue to update a recovery map 504d to reflect a current state of memory for a memory system 106 up until detecting a subsequent checkpoint. Accordingly, a current version of the snapshot stream may refer to the same updated snapshot stream 502c as discussed above in connection with FIG. 5C where a second updated first segment ($S_1^2$) is partially generated (or completely generated), but has not yet been added to a current version of the snapshot stream. Nevertheless, as shown in FIG. 5D, the memory recovery system 104 can continue generating additional journal updates 512 to include within the current version of the recovery map 504d prior to updating the snapshot stream, as will be discussed below in connection with FIG. 5E.

As shown in FIG. 5E, the memory recovery system 104 may wait to update the snapshot stream until the current time ($t_c$) corresponds to the third time ($t_3$) associated with a third checkpoint. Upon detecting the third checkpoint, the memory recovery system 104 can update the recovery map 504e to include an updated snapshot stream 502d including a first updated second segment ($S_2^1$) and a second updated first segment ($S_1^2$) to replace a now outdated first segment ($S_1^1$) 506c. The second updated first segment ($S_1^2$) may be associated with the same portion of the memory system 106 as the outdated first segment ($S_1^1$) 506c.

In addition to discarding the outdated segment 506c, the memory recovery system 104 may additionally discard one or more outdated journal updates 514. In particular, as shown in FIG. 5E, the memory recovery system 104 may discard any journal updates outside of a current replay window of the current snapshot stream 502d. Accordingly, as shown in FIG. 5E, the memory recovery system 104 may update the $t_3$ recovery map 504e to include the updated memory stream 502d as well as discard the outdated journal updates 514 to include only those journal updates between $t_1$ and $t_3$ (e.g., those journal updates within the current replay window).

As discussed above in connection with FIGS. 5D-5E, the snapshot stream may include a current replay window corresponding to a first current checkpoint of a current version of the snapshot stream stored in a recovery map and a current time ($t_c$) associated with a current state of memory of the memory system 106. For example, in FIG. 5D, a replay window may refer to a time period between the initial checkpoint ($t_0$) (referring to a least recent checkpoint of the updated snapshot stream 502c as stored within the corresponding recovery map 504d) and a current time ($t_c$). In this example, in response to the computing device 102 experiencing an unexpected power loss event, the memory recovery system 104 may recover the current state of memory by identifying a current memory stream 502c (e.g., not considering the partially generated segment 510) and all journal updates beginning at the beginning of the recovery window (e.g., all journal updates between $t_0$ and $t_c$). The memory recovery system 104 may then apply the identified journal updates 508a-b, 512 to the updated snapshot stream 502c and recover the current state of memory for the memory system 106.

As another example in connection with FIG. 5E, where the computing device 102 experiences an unexpected power loss event at the third time ($t_3$) (or shortly after updating the memory map), the memory recovery system 104 may consider the snapshot stream from the $t_1$ checkpoint to a current time ($t_c$) in addition to the journal updates beginning from the first time ($t_1$) rather than the initial time ($t_0$) as would be done in connection with recovering the memory state at the current time ($t_c$) shown in FIG. 5D.

In contrast to conventional systems where all progress to a partially generated memory snapshot is lost in response to an unplanned power event, by continually updating a snapshot stream and periodically updating a corresponding recovery map at checkpoints as discussed in FIGS. 5A-5E, the memory recovery system 104 may avoid scenarios in which all progress of a partially generated snapshot is lost as a result of a power loss event. Indeed, while FIGS. 5A-5E illustrate an example snapshot stream including only two segments, the memory recovery system 104 may similarly perform periodic updates to the information contained in a current version of the recovery map based on more granular updates to the snapshot stream. In this way, the amount of progress lost as a result of an unexpected power loss event is limited to the time between checkpoints and the frequency and number of segments that are iteratively updated for the snapshot stream. Thus, as shown in the example of FIG. 5D, only the partial progress of a most recent segment update may be lost while benefiting from any segments included within a current replay window for the snapshot stream.

Figure 6:
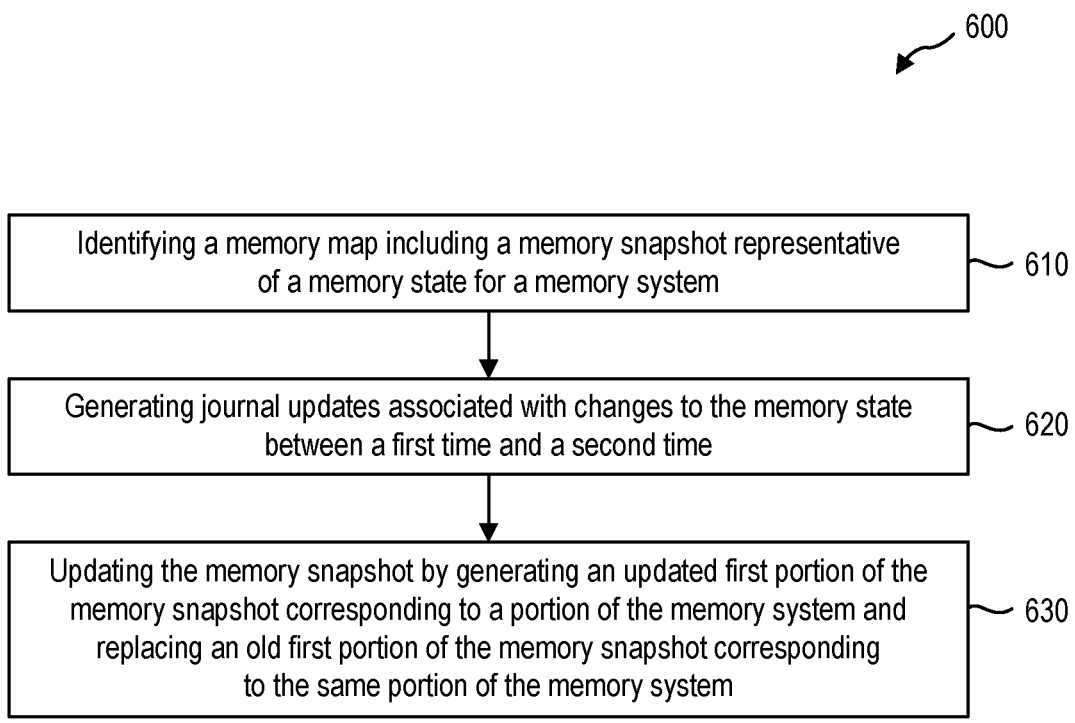
FIG. 6 illustrates an example series of acts for generating and updating a recovery map in accordance with one or more embodiments.
Figure 7:
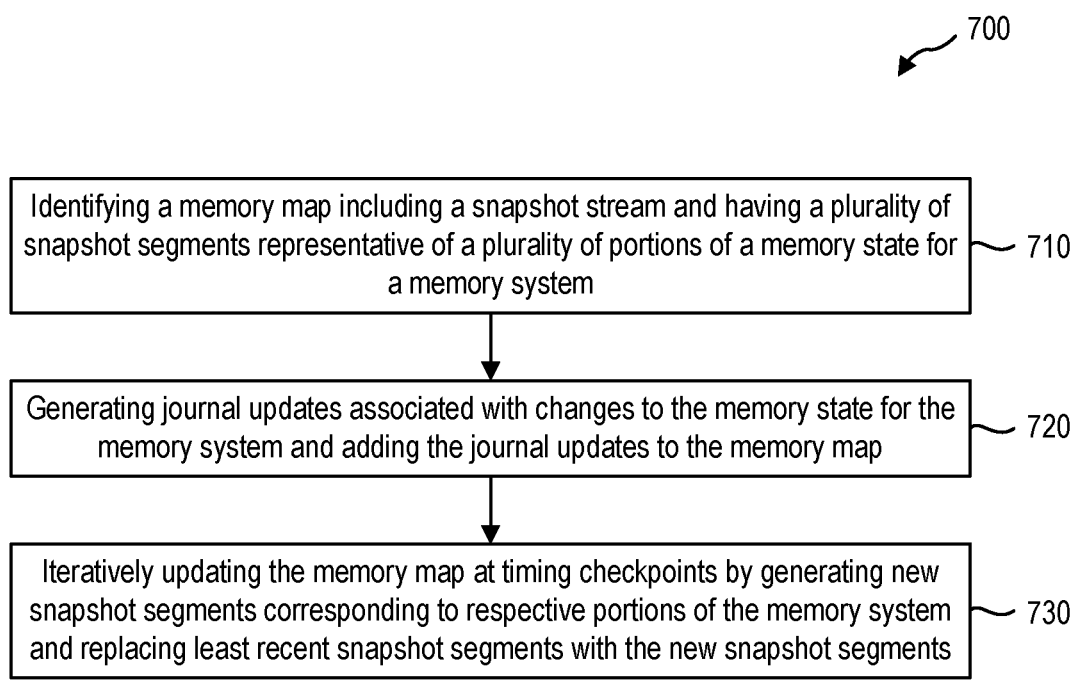
FIG. 7 illustrates another example series of acts for generating and updating a recovery map in accordance with one or more embodiments.

Turning now to FIGS. 6-7, these figures illustrates example flowcharts including series of acts for performing iterative updates of a recovery map including a plurality of snapshot segments and a current set of journal updates. While FIGS. 6-7 illustrates acts according to one or more embodiments, alternative embodiments may omit, add to, reorder, and/or modify any of the acts shown in FIGS. 6-7. Moreover, one or more of the individual features and functionalities described in connection with individual acts or series of acts in connection with FIGS. 6-7 may similarly apply to other embodiments and examples described herein. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

FIG. 6 illustrates an example series of acts 600 for iteratively updating a recovery map in accordance with one or more embodiments described herein. For example, the series of acts 600 may include an act 610 of identifying a memory map including a memory snapshot representative of a memory state for a memory system. For example, the act 610 may include identifying a recovery map having a memory snapshot that includes a representation of a memory state for a memory system at a first time associated with when the memory snapshot was generated.

As further shown, the series of acts 600 may include an act 620 of generating journal updates associated with changes to the memory state between a first time and a second time. For example, the act 620 may include generating journal updates associated with changes to the memory state between the first time and a second time after the memory snapshot was generated and adding the journal updates to the recovery map.

As further shown, the series of acts 600 includes an act 630 of updating the memory snapshot by generating an updated first portion of the memory snapshot corresponding to a portion of the memory system and replacing an old first portion of the memory snapshot corresponding to the same portion of the memory system. For example, based on a number of the journal updates generated between the first time and the second time, the act 630 may include generating an updated version of the memory snapshot. Generating the updated version of the memory shot may include generating an updated first portion of the memory snapshot including a representation of a memory state for a first portion of the memory system at the second time and replacing a first portion of the memory snapshot associated with the first portion of the memory system with the updated first portion of the memory snapshot. The first portion of the memory system may include a subset of memory locations on the memory system, and wherein the first portion of the snapshot comprises state data for logical block addresses (LBAs) corresponding to the subset of memory locations on the memory system.

In one or more embodiments, the series of acts 600 includes discarding any outdated journal updates from the recovery map. For example, discarding any outdated journal updates from the recovery map may include determining a time associated with generation of the first portion of the memory snapshot and discarding one or more journal updates associated with changes to the memory state for the memory system based on timestamps of the one or more journal updates that pre-date the time associated with generation of the first portion of the memory snapshot.

In one or more embodiments, the series of acts 600 may include generating additional journal updates associated with changes to the memory state between the second time and a third time and adding the additional journal updates to the recovery map. The series of acts 600 may further include generating a second updated version of the memory snapshot. Generating the second updated version of the memory snapshot may include generating an updated second portion of the memory snapshot including a representation of a memory state for the second portion of the memory system at the third time and replacing a second portion of the memory snapshot associated with the second portion of the memory system with the updated second portion of the memory snapshot.

The first portion of the memory snapshot and the second portion of the memory snapshot may be a complete representation of the memory state for times associated with generation of the first portion of the memory snapshot and the second portion of the memory snapshot. Further, generating the second updated portion of the memory snapshot further comprises discarding any journal updates from the recovery map having associated timestamps that pre-date the first time associated with when the memory snapshot was generated.

In one or more embodiments, generating the updated version of the memory snapshot includes initiating generation of the updated version of the memory snapshot in response to detecting a threshold number of writes to the memory system. Further, in one or more embodiments, a duration between the first time and the second time is based on a duration of time in which the threshold number of writes to the memory system are detected.

In one or more embodiments, the series of acts 600 includes detecting a power loss event (e.g., an unplanned power loss event). The series of acts 600 may further include recovering a current state of the memory system at a time of the power loss event based on the updated version of the memory snapshot and the journal updates from the recovery map. In one or more embodiments, the memory system includes volatile storage media of a computing device. Further, the series of acts 600 may include storing the recovery map on non-volatile storage media of the computing device. In one or more implementations, the volatile storage media includes dynamic random-access memory (DRAM) and the non-volatile storage media comprises one or more solid state drives (SSDs).

FIG. 7 illustrates another example series of acts 700 for iteratively updating a recovery map in accordance with one or more embodiments described herein. For example, the series of acts 700 includes an act 710 of identifying a memory map including a snapshot stream and having a plurality of snapshot segments representative of a plurality of portions of a memory state for a memory system. For example, the act 710 may include identifying a recovery map including a snapshot stream that includes a plurality of snapshot segments where the plurality of snapshot segments includes representations of a plurality of portions of a memory state for a memory system.

In one or more embodiments, the plurality of snapshot segments include state data for logical block addresses (LBAs) to subsets of memory locations on the memory system as captured at corresponding timing checkpoints associated with a plurality of times at each of the snapshot segments of the plurality of snapshot segments were captured. Further, in one or more embodiments, the timing checkpoints include regular intervals at which iterative updates of the recovery map are initiated where a duration of time between the timing checkpoints and a number of portions of the plurality of portions are based on a quantity of processing resources of a computing device available for maintaining the snapshot stream.

As further shown, the series of acts 700 includes an act 720 of generating journal updates associated with changes to the memory state for the memory system and adding the journal updates to the memory map. For example, the act 720 may include generating journal updates associated with changes to the memory state for the memory system and adding the journal updates to the recovery map.

As further shown, the series of acts 700 includes an act 730 of iteratively updating the memory map at timing checkpoints by generating new snapshot segments corresponding to respective portions of the memory system and replacing least recent snapshot segments with the new snapshot segments. For example, the act 730 may include iteratively updating the recovery map at timing checkpoints of the plurality of snapshot segments to generate an updated plurality of snapshot segments of the snapshot stream. Updating the recovery map may include generating a new snapshot segment for a portion of the memory state corresponding to a least recent snapshot segment from the snapshot stream and replacing the least recent snapshot segment with the new snapshot segment. In one or more embodiments, iteratively updating the recovery map includes discarding any outdated journal updates from the recovery map based on timestamps associated with the outdated journal updates relative to a least recent timing checkpoint of the plurality of snapshot segments.

In one or more embodiments, the series of acts 700 includes generating additional journal updates associated with additional changes to the memory state for the memory system and adding the additional journal updates to the recovery. The series of acts 700 may further include initiating generation of an additional new snapshot segment for an additional portion of the memory state corresponding to a least recent snapshot of the updated plurality of snapshot segments. The series of acts 700 may further include detecting a power loss event prior to finishing generation of the additional new snapshot segment. The series of acts 700 may also include recovering a current state of the memory system at a time of the power loss event based on the updated plurality of snapshot segments and all journal updates within the recovery map at the time of the power loss.

Figure 8:
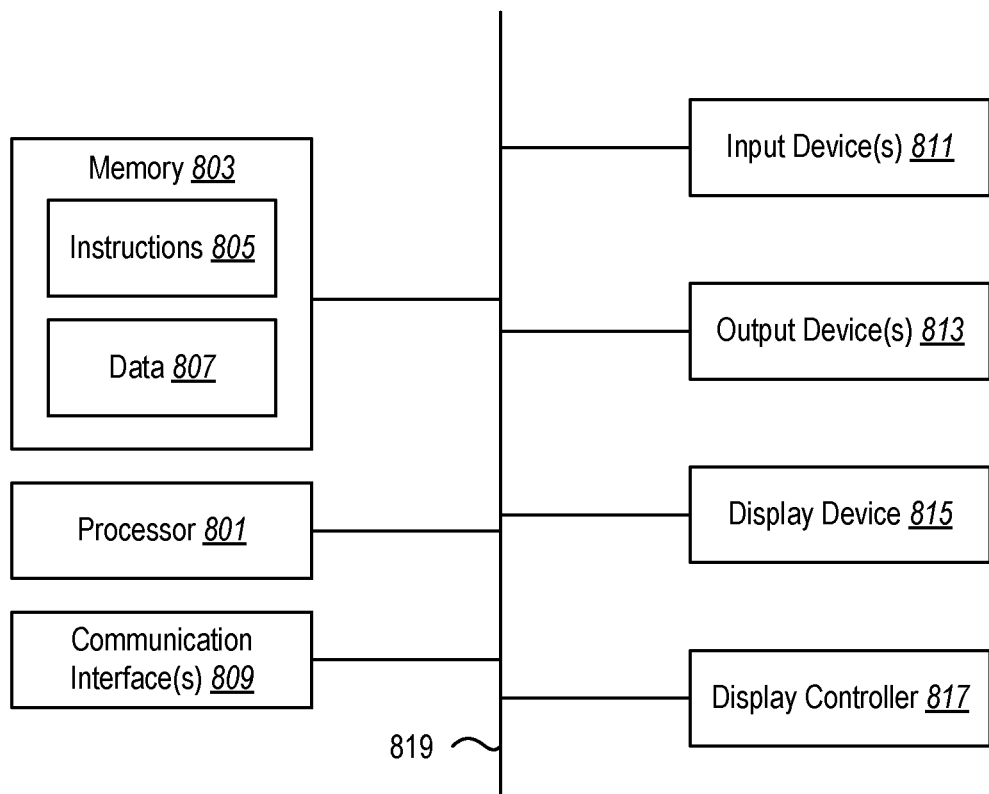
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying a recovery map comprising a memory snapshot that includes a representation of a memory state for a memory system at a first time associated with when the memory snapshot was generated, the memory snapshot including a plurality of portions;
   generating journal updates associated with changes to the memory state between the first time and a second time after the memory snapshot was generated and adding the journal updates to the recovery map;
   based on a number of the journal updates generated between the first time and the second time, generating an updated version of the memory snapshot, wherein generating the updated version of the memory snapshot comprises:
      generating an updated first portion of the memory snapshot including a representation of a memory state for a first portion of the memory system at the second time; and
      replacing a first portion from the plurality of portions of the memory snapshot associated with the first portion of the memory system with the updated first portion of the memory snapshot;
   generating additional journal updates associated with changes to the memory state between the second time and a third time and adding the additional journal updates to the recovery map; and
   generating an updated second version of the memory snapshot, wherein generating the second updated version of the memory snapshot includes:
      generating an updated second portion of the memory snapshot including a representation of a memory state for the second portion of the memory system at the third time; and
      replacing a second portion of the memory snapshot associated with the second portion of the memory system with the updated second portion of the memory snapshot.

2. The method of claim 1, further comprising discarding any outdated journal updates from the recovery map.

3. The method of claim 2, wherein discarding any outdated journal updates from the recovery map comprises:
   determining a time associated with generation of the first portion of the memory snapshot; and
   discarding one or more journal updates associated with changes to the memory state for the memory system based on timestamps of the one or more journal updates that pre-date the time associated with generation of the first portion of the memory snapshot.

4. The method of claim 1, wherein the first portion of the memory system includes a first physical region of memory hardware from the memory system comprising a subset of memory locations on the memory system, and wherein the first portion of the snapshot comprises state data for logical block addresses (LBAs) corresponding to the subset of memory locations on the memory system.

5. The method of claim 1, wherein the first portion of the memory snapshot and the second portion of the memory snapshot are a complete representation of the memory state for times associated with generation of the first portion of the memory snapshot and the second portion of the memory snapshot, and wherein generating the second updated portion of the memory snapshot further comprises discarding any journal updates from the recovery map having associated timestamps that pre-date the first time associated with when the memory snapshot was generated.

6. The method of claim 1,
   wherein generating the updated version of the memory snapshot comprises initiating generation of the updated version of the memory snapshot in response to detecting a threshold number of writes to the memory system, and
   wherein a duration between the first time and the second time is based on a duration of time in which the threshold number of writes to the memory system are detected.

7. The method of claim 1, further comprising:
   detecting a power loss event; and recovering a current state of the memory system at a time of the power loss event based on the updated version of the memory snapshot, the updated second version of the memory snapshot, and the journal updates from the recovery map.

8. The method of claim 1, wherein the memory system comprises volatile storage media of a computing device, and further comprising storing the recovery map on non-volatile storage media of the computing device.

9. The method of claim 8, wherein the volatile storage media comprises dynamic random-access memory (DRAM) and the non-volatile storage media comprises one or more solid state drives (SSDs).

10. The method of claim 8, wherein the memory system comprises dynamic random-access memory (DRAM) on a computing device, and further comprising storing the recovery map on one or more solid state drives (SSDs) of the computing device.

11. A method, comprising:
identifying a recovery map comprising a snapshot stream that includes a plurality of snapshot segments, the plurality of snapshot segments including representations of a plurality of portions of a memory state for a memory system at times associated with when the plurality of snapshot segments were generated;
generating journal updates associated with changes to the memory state for the memory system and adding the journal updates to the recovery map; and
iteratively updating the recovery map at timing checkpoints of the plurality of snapshot segments to generate an updated plurality of snapshot segments of the snapshot stream, wherein iteratively updating the recovery map comprises:
generating, at a first time, a first new snapshot segment for a first portion of the memory state corresponding to a first recent snapshot segment from the snapshot stream associated with the first portion of the memory state;
replacing the first least recent snapshot segment with the first new snapshot segment;
generating, at a second time, a second new snapshot segment for a second portion of the memory state corresponding to a second recent snapshot segment from the snapshot stream associated with the second portion of the memory state; and
replacing the second recent snapshot segment with the second new snapshot segment.

12. The method of claim 11, wherein iteratively updating the recovery map further comprises discarding any outdated journal updates from the recovery map based on timestamps associated with the outdated journal updates relative to a least recent timing checkpoint of the plurality of snapshot segments.

13. The method of claim 11, wherein the plurality of snapshot segments include state data for logical block addresses (LBAs) to subsets of memory locations on the memory system as captured at corresponding timing checkpoints associated with a plurality of times when each of the snapshot segments of the plurality of snapshot segments were captured.

14. The method of claim 11, wherein the timing checkpoints comprise regular intervals at which iterative updates of the recovery map are initiated, and wherein a duration of time between the timing checkpoints and a number of portions of the plurality of portions of the memory state are based on a quantity of processing resources of a computing device available for maintaining the snapshot stream.

15. The method of claim 11, further comprising:
generating additional journal updates associated with additional changes to the memory state for the memory system and adding the additional journal updates to the recovery map;
initiating generation of an additional new snapshot segment for an additional portion of the memory state corresponding to a least recent snapshot of the updated plurality of snapshot segments;
detecting a power loss event prior to finishing generation of the additional new snapshot segment; and
recovering a current state of the memory system at a time of the power loss event based on the updated plurality of snapshot segments and all journal updates within the recovery map at the time of the power loss.

16. A system, comprising:
one or more processors;
memory in electronic communication with the one or more processors; and
instructions stored in the memory, the instructions being executable by the one or more processors to:
identify a recovery map comprising a memory snapshot that includes a representation of a memory state for a memory system at a first time associated with when the memory snapshot was generated, the memory snapshot including a plurality of portions;
generate journal updates associated with changes to the memory state between the first time and a second time after the memory snapshot was generated and adding the journal updates to the recovery map;
generate an updated version of the memory snapshot, wherein generating the updated version of the memory snapshot comprises:
generating an updated first portion of the memory snapshot including a representation of a memory state for a first portion of the memory system at the second time; and
replacing a first portion from the plurality of portions of the memory snapshot associated with the first portion of the memory system with the updated first portion of the memory snapshot;
generating additional journal updates associated with changes to the memory state between the second time and a third time and adding the additional journal updates to the recovery map; and
generating an updated second version of the memory snapshot, wherein generating the second updated version of the memory snapshot includes:
generating an updated second portion of the memory snapshot including a representation of a memory state for the second portion of the memory system at the third time; and
replacing a second portion of the memory snapshot associated with the second portion of the memory system with the updated second portion of the memory snapshot.

17. The system of claim 16, further comprising instructions being executable by the one or more processors to discard one or more journal updates associated with writes to the memory system based on timestamps of the one or more journal updates that pre-date the time associated with generation of the first portion of the memory snapshot.

18. The system of claim 16, wherein generating the updated version of the memory snapshot comprises initiating generation of the updated version of the memory snapshot in response to detecting a threshold number of writes to the memory system.

19. The system of claim 16, further comprising instructions being executable by the one or more processors to:
  detect a power loss event, the power loss event comprising an unplanned loss of power to the memory system; and
  recovering a current state of the memory system at a time of the power loss event based on the second updated version of the memory snapshot and the journal updates from the recovery map.

20. The system of claim 16, wherein the first portion of the memory system includes a first physical region of memory hardware from the memory system comprising a subset of memory locations on the memory system, and wherein the first portion of the snapshot comprises state data for logical block addresses (LBAs) corresponding to the subset of memory locations on the memory system.

* * * * *